US008907798B2

(12) United States Patent
Meis et al.

(10) Patent No.: US 8,907,798 B2
(45) Date of Patent: Dec. 9, 2014

(54) SUPERCOOLED LARGE DROP ICING CONDITION DETECTION SYSTEM

(75) Inventors: Charles Steven Meis, Renton, WA (US); Cris Kevin Bosetti, Seattle, WA (US)

(73) Assignee: The Boeing Company, Chicago, IL (US)

( * ) Notice: Subject to any disclaimer, the term of this patent is extended or adjusted under 35 U.S.C. 154(b) by 320 days.

(21) Appl. No.: 13/344,144

(22) Filed: Jan. 5, 2012

(65) Prior Publication Data

US 2013/0175396 A1 Jul. 11, 2013

(51) Int. Cl.
*G08B 19/02* (2006.01)
*G08B 21/00* (2006.01)
*G05B 1/00* (2006.01)
*G01K 17/00* (2006.01)
*G06F 7/70* (2006.01)
*B60L 1/02* (2006.01)

(52) U.S. Cl.
USPC ........ 340/580; 340/962; 340/146.2; 702/136; 701/14; 219/202

(58) Field of Classification Search
CPC ..................................................... B64D 15/22
USPC .......... 340/580, 962, 146.2; 702/136; 701/14; 219/202
See application file for complete search history.

(56) References Cited

U.S. PATENT DOCUMENTS 5,248,116 A * 9/1993 Rauckhorst ............... 244/134 A
5,354,015 A 10/1994 Meador
5,474,261 A 12/1995 Stolarczyk et al.
5,484,121 A 1/1996 Padawer et al.
6,731,225 B2 5/2004 Vopatq
6,759,962 B2 7/2004 Severson et al.
8,144,325 B2 3/2012 Ray et al.
8,200,451 B2 6/2012 Battisti
2004/0206854 A1 10/2004 Shah et al.
2007/0216536 A1* 9/2007 Alfano et al. ................. 340/583
2008/0128556 A1* 6/2008 Platt .......................... 244/134 F
2008/0167764 A1 7/2008 Flemming
2009/0306928 A1 12/2009 Battisti
2010/0123044 A1 5/2010 Botura
2011/0019188 A1 1/2011 Ray et al.
2013/0113926 A1* 5/2013 Chen et al. .................... 348/135

FOREIGN PATENT DOCUMENTS

EP 1254833 A1 6/2002

OTHER PUBLICATIONS

"FAA Inflight Aircraft Icing Plan," United States Department of Transportation Federal Aviation Administration, Apr. 1977, 60 pp.
"CFR NPRM," Federal Register, vol. 75, No. 124, Jun. 2010, pp. 37311-37339.

(Continued)

*Primary Examiner* — Jack K Wang
(74) *Attorney, Agent, or Firm* — Yee & Associates, P.C.

(57) ABSTRACT

An ice detection system comprising a first group of sensors and a second group of sensors. The first group of sensors is located in a first group of locations on an aircraft. The first group of sensors in the first group of locations is configured to detect a first type of icing condition for the aircraft. The second group of sensors is located in a second group of locations on the aircraft. The second group of sensors in the second group of locations is configured to detect a second type of icing condition for the aircraft.

17 Claims, 8 Drawing Sheets

(56) References Cited

OTHER PUBLICATIONS

PCT search report dated Mar. 6, 2013 regarding application PCT/US2012/066515, filing date Nov. 26, 2012, applicant The Boeing Company, 12 pages.

Meis et al., "Supercooled Large Drop Icing Condition Detection System," regarding U.S. Appl. No. 13/414,894, filed Mar. 8, 2012, 54 pages.

Office Action dated Aug. 14, 2014 regarding USPTO Application No. 13/414,894, 27 pages.

* cited by examiner

SUPERCOOLED LARGE DROP ICING CONDITION DETECTION SYSTEM

BACKGROUND INFORMATION

1. Field

The present disclosure relates generally to detecting icing conditions and, in particular, to icing conditions for an aircraft. Still more particularly, the present disclosure relates to detecting supercooled water drops, including supercooled large drops (SLD).

2. Background

In aviation, icing on an aircraft may occur when the atmospheric conditions lead to the formation of ice on the surfaces of the aircraft. Further, this ice also may occur within the engine. Ice forming on the surfaces of the aircraft, on inlets of an engine, and other locations are undesirable and potentially unsafe for operating the aircraft.

Icing conditions may occur when drops of supercooled liquid water are present. In these illustrative examples, water is considered to be supercooled when the water is cooled below the stated freezing point for water but is still in a liquid form. Icing conditions may be characterized by the size of the drops, the liquid water content, air temperature, and other parameters. These parameters may affect the rate and extent at which ice forms on an aircraft.

When icing occurs, the aircraft does not operate as desired. For example, ice on the wing of an aircraft will cause the aircraft to stall at a lower angle of attack and have an increased drag.

Aircraft may have mechanisms to prevent icing, remove ice, or some combination thereof to handle these icing conditions. For example, aircraft may include icing detection, prevention, and removal systems. Ice may be removed using deicing fluid, infrared heating, and other suitable mechanisms.

Aircraft may be certified for operating during different types of icing conditions. Some aircraft may be certified to operate in normal icing conditions, but not those that include supercooled large drops. Currently used sensors are unable to differentiate between normal and supercooled large drop icing conditions.

Therefore, it would be desirable to have a method and apparatus that takes into account one or more of the issues discussed above as well as possibly other issues.

SUMMARY

In one illustrative embodiment, an ice detection system comprises a first group of sensors and a second group of sensors. The first group of sensors is located in a first group of locations on an aircraft. The first group of sensors in the first group of locations is configured to detect a first type of icing condition for the aircraft. The second group of sensors is located in a second group of locations on the aircraft. The second group of sensors in the second group of locations is configured to detect a second type of icing condition for the aircraft.

In another illustrative embodiment, an ice detection system comprises a group of sensors and a processor unit. The group of sensors is located in a group of locations on a surface of an aircraft. The group of sensors in the group of locations is configured to detect a supercooled large drop icing condition on the surface of the aircraft. The processor unit is configured to monitor data from the group of sensors and perform an action in response to the data indicating a presence of the supercooled large drop icing condition on the surface of the aircraft.

In yet another illustrative embodiment, a method for detecting icing conditions for an aircraft is provided. A first group of sensors located in a first group of locations on the aircraft is monitored for first data indicating a first type of icing condition in the icing conditions for the aircraft. A second group of sensors located in a second group of locations on the aircraft is monitored for second data indicating a second type of icing condition in the icing conditions for the aircraft. An action is initiated in response to detecting at least one of the first type of icing condition from the first data and the second type of icing condition from the second data.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

The illustrative embodiments recognize and take into account a number of different considerations. For example, the different illustrative embodiments recognize and take into account that currently used systems for detecting icing conditions on an aircraft are unable to detect all of the different types of icing conditions that may occur. For example, the different illustrative embodiments recognize and take into account that as the size of the drops of water increase, currently used sensors may not detect icing caused by those drops of water. The different illustrative embodiments recognize and take into account that the locations at which different sizes of drops will collide with an airfoil during operation of an aircraft change depending on the size of the drops.

The illustrative embodiments recognize and take into account that it is desirable to detect different types of icing conditions that may be caused by different sizes of drops of water. In particular, the illustrative embodiments recognize and take into account that it may be desirable to detect drops of supercooled liquid water. These drops may take the form of supercooled large drops.

Thus, one or more illustrative embodiments provide a method and apparatus for detecting ice. In one illustrative embodiment, an ice detection system comprises a first group of sensors and a second group of sensors. The first group of sensors is located in a first group of locations on an aircraft. The first group of sensors in the first group of locations is configured to detect a first type of icing condition for the aircraft.

A second group of sensors is located in a second group of locations on the aircraft. The second group of sensors in the second group of locations is configured to detect a second type of icing condition for the aircraft. These two types of icing conditions are examples of icing conditions that may occur in different locations on the aircraft.

Figure 1:
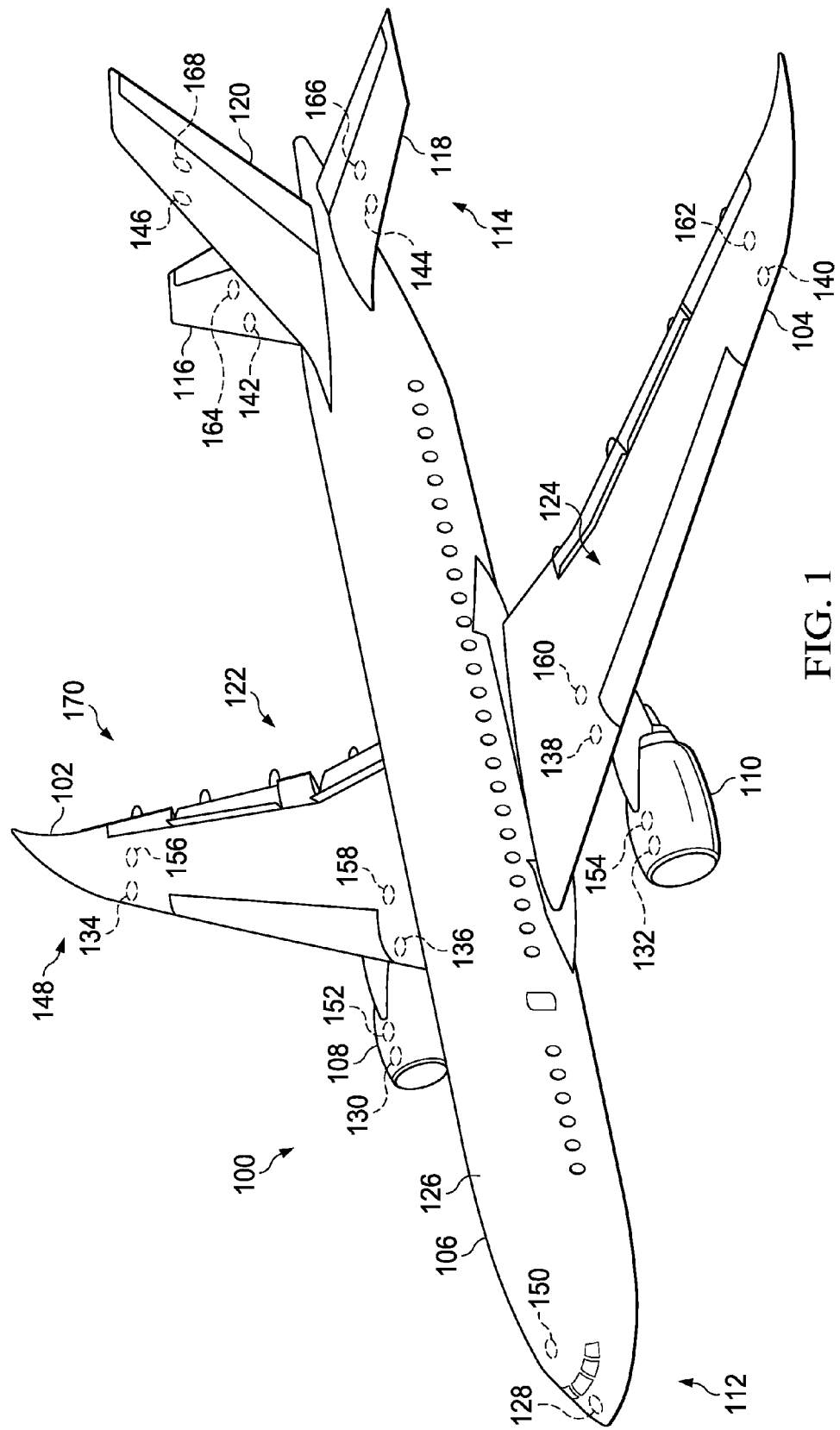
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106. Aircraft 100 also includes engine 108 attached to wing 102 and engine 110 attached to wing 104.

Fuselage 106 has nose section 112 and tail section 114. Nose section 112 is the forward part of aircraft 100, while tail section 114 is the aft part of aircraft 100. Horizontal stabilizer 116, horizontal stabilizer 118, and vertical stabilizer 120 are attached to tail section 114 of fuselage 106.

Aircraft 100 is an example of an aircraft in which ice detection system 122 may be implemented in accordance with an illustrative embodiment. In these illustrative examples, ice detection system 122 comprises sensors 124 on surface 126 of aircraft 100. As depicted, sensors 124 include sensors 128, 130, 132, 134, 136, 138, 140, 142, 144, and 146. These sensors form first group of sensors 148 in sensors 124 for ice detection system 122.

Additionally, sensors 124 also include sensors 150, 152, 154, 156, 158, 160, 162, 164, 166, and 168. These sensors form second group of sensors 170 in sensors 124 for ice detection system 122. In the illustrative examples, sensors 124 may detect when ice is formed on the sensors.

As depicted, first group of sensors 148 is in a first group of locations on surface 126 of aircraft 100. First group of sensors 148 is configured to detect a first type of icing condition for aircraft 100. Second group of sensors 170 is in a second group of locations on surface 126 of aircraft 100. Second group of sensors 170 in the second locations is configured to detect a second type of icing condition for aircraft 100.

In these illustrative examples, these icing conditions may occur at different altitudes and temperatures that cause the formation of ice on aircraft 100. For example, icing conditions may be present at an altitude from about sea level to about 30,000 feet when the temperature is from about −40 degrees Celsius to about 0 degrees Celsius. Of course, other altitudes and temperatures may be present at which ice may be formed from water that contacts surface 126 of aircraft 100. Icing conditions also may be present when the liquid water content in the drops is from about 0.4 to about 2.8 grams/cubic meter at the altitude and temperature range described above.

As depicted, the first type of icing condition and the second type of icing condition are caused by drops of water of different sizes. Although the altitude, temperature, and liquid water content ranges may be the same, one difference between the first and second types of icing conditions is the drop size.

In these illustrative examples, the first type of icing condition may be present when the size of the drops is from about 0.00465 millimeters in diameter to about 0.111 millimeters in diameter. Drops with these sizes may be referred to as normal drops. The second type of icing condition may be present when the size of the drops includes drops that have a diameter greater than about 0.111 millimeters. Drops having a size greater than about 0.111 millimeters may be referred to as large drops and, in particular, may be called supercooled large drops under the altitude, temperature, and liquid water content conditions described above. For example, the drops may have a diameter of a range from about 0.112 millimeters to about 2.2 millimeters. In addition, the second type of icing condition may include drops that are 0.111 millimeters or less when drops greater than 0.111 millimeters are present.

As depicted, first group of sensors 148 in the first group of locations may be configured to detect ice formed by drops of water in a first number of sizes. Second group of sensors 170 in the second group of locations is configured to detect ice formed by drops of water having a second number of sizes. In these illustrative examples, the first number of sizes is smaller than the second number of sizes.

For example, the first number of sizes may be from about 0.00465 millimeters in diameter to about 0.111 millimeters in diameter. The second number of sizes may be from about 0.112 millimeters to about 2.2 millimeters in diameter.

The second number of sizes of the drops of water may be drops of water that are considered to be drops of supercooled water. These drops of supercooled water may be supercooled large drops (SLD). First group of sensors 148 is configured to detect drops of water that are not supercooled large drops in these illustrative examples. The type of icing condition detected by sensors 124 is based on the locations for sensors 124 on surface 126 of aircraft 100 in these illustrative examples.

In the illustrative examples, the first type of icing condition may be referred to as a normal icing condition. The second type of icing condition may be referred to as a supercooled large drop icing condition.

In these illustrative examples, sensors 124 are depicted as flush-mounted sensors. In other words, sensors 124 are substantially flush or planar with surface 126 of aircraft 100. Sensors 124 may be implemented using all of the same type of sensors or different types of sensors. Further, other numbers of sensors 124 and locations of sensors 124 may be used in addition to or in place of those illustrated for aircraft 100 in FIG. 1.

Although particular conditions and sizes for drops have been described for the first icing condition and the second icing condition, the different illustrative embodiments are not limited to the conditions and sizes depicted. For example, other altitudes and drop sizes may be used to define when drops of water are present for the first icing condition and the second icing condition.

However, while FIG. 1 illustrates embodiments using a twin-engine aircraft for example, the illustrative embodiments recognize and take into account that the information contained is also applicable to aircraft with different numbers of engines. Further, the illustrative example depicts aircraft 100 as a commercial aircraft. The different illustrative embodiments may be applied to other types of aircraft, such as military aircraft.

Figure 2:
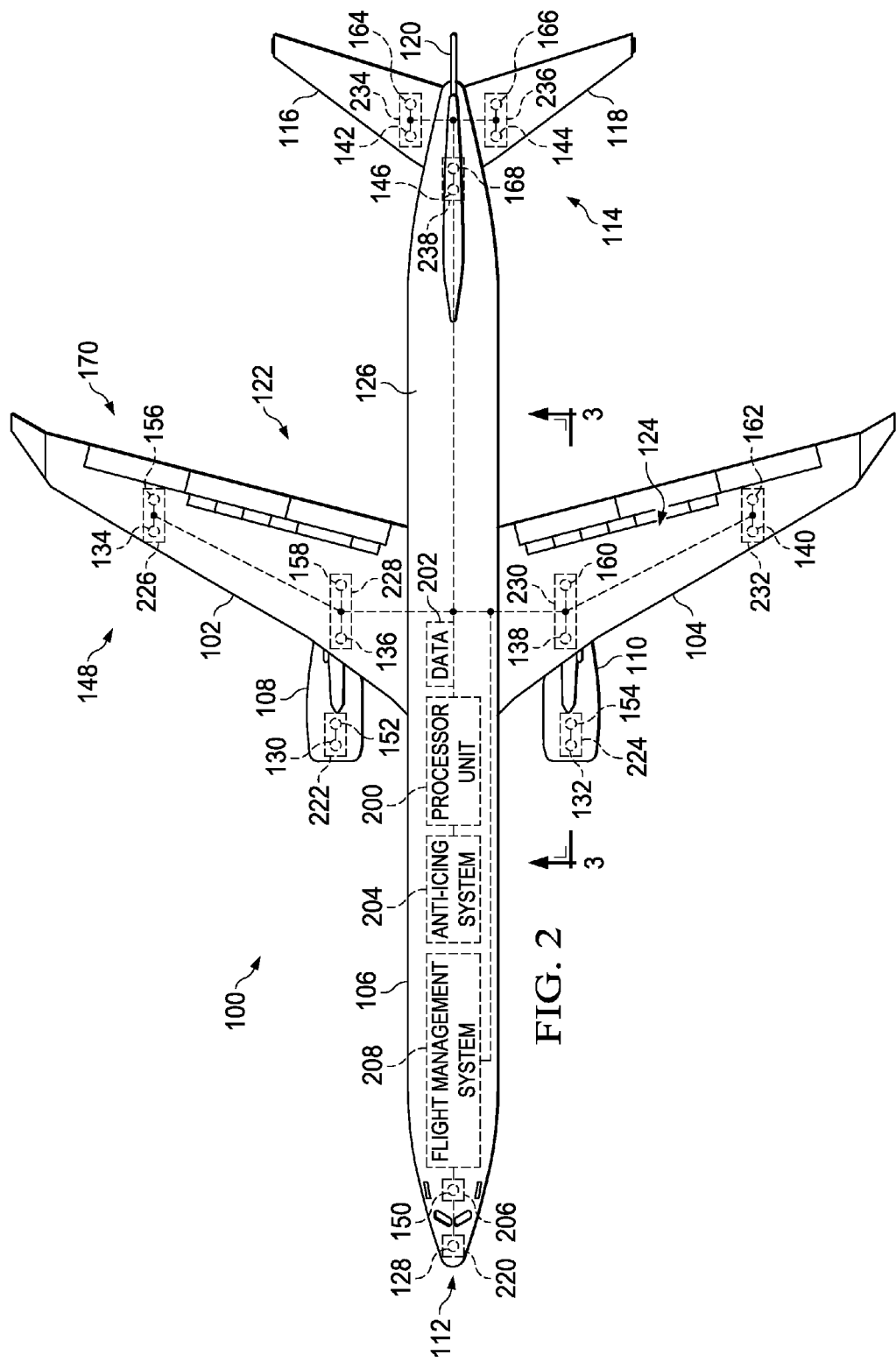
FIG. 2 is an illustration of components in an ice detection system in accordance with an illustrative embodiment.

With reference now to FIG. 2, an illustration of components in an ice detection system is depicted in accordance with an illustrative embodiment. In this illustrative example, ice detection system 122 further comprises processor unit 200. Processor unit 200 is a hardware device configured to perform operations with respect to detecting icing conditions for aircraft 100. These operations may be implemented in software, hardware, or a combination of the two.

As illustrated, processor unit 200 is connected to sensors 124. In these illustrative examples, sensors 124 generate data 202. Data 202 may indicate whether sensors 124 detect the formation of ice on surface 126 of aircraft 100. Ice is detected by sensors 124 when ice forms on one or more of sensors 124. Sensors 124 send data 202 to processor unit 200.

In these illustrative examples, processor unit 200 is configured to monitor the data from first group of sensors 148 and second group of sensors 170. Further, processor unit 200 is configured to perform an action in response to the data indicating a presence of one of the icing conditions. The particular type of icing condition detected depends on which group of sensors generating data indicates a presence of ice. In other words, the first icing condition, the second icing condition, or both the first icing condition and the second icing condition may be present depending on the data generated by sensors 124.

The action may include at least one of generating an alert, generating a log entry, activating anti-icing system 204, sending a report, and other suitable actions. As used herein, the phrase "at least one of", when used with a list of items, means different combinations of one or more of the listed items may be used and only one of each item in the list may be needed. For example, "at least one of item A, item B, and item C" may include, without limitation, item A, or item A and item B. This example also may include item A, item B, and item C, or item B and item C.

In these illustrative examples, the alert may be generated on flight deck interface 206 for aircraft 100. Flight deck interface 206 is a display system located in the flight deck of aircraft 100. The display system comprises a number of displays on which information may be displayed to operators. These displays are hardware devices in the illustrative examples.

As used herein, a "number", when used with reference to items, means one or more items. For example, "a number of displays" is one or more displays. The number of displays may include, for example, without limitation, a primary flight display, a navigation display, and other suitable types of displays.

Further, the log entry may be generated in flight management system 208. Flight management system 208 is a computer system in aircraft 100. This computer system may be comprised of a number of computers. When more than one computer is present in the computer system, those computers may be in communication with each other using a communications media, such as a local area network.

Processor unit 200 may send a report to flight management system 208. Alternatively, the report may be sent to a remote location in addition to or in place of sending the report to flight management system 208. In these illustrative examples, the report may include an indication of what type of icing condition or conditions is present. This report also may include a location of the sensor or sensors detecting the icing condition.

Another action that processor unit 200 may take is to initiate the operation of anti-icing system 204. Anti-icing system 204 may be implemented using any currently available anti-icing system. Anti-icing system 204 may employ different types of mechanisms to remove or prevent the formation of ice on surface 126 of aircraft 100. For example, anti-icing system 204 may employ mechanical systems, chemical systems, infrared heating systems, and other types of systems to remove ice, prevent the formation of ice, or both on surface 126 of aircraft 100.

In these illustrative examples, sensors 124 may be configured in ice detection assemblies. For example, sensors 124 may be grouped as ice detection assemblies 220, 222, 224, 226, 228, 230, 232, 234, 236, and 238. Each sensor in an ice detection assembly may be configured to detect a particular type of icing condition. This type of grouping of sensors 124 may be used in selecting locations for sensors 124. Of course, in some illustrative examples, sensors 124 may not be grouped in ice detection assemblies.

Figure 3:
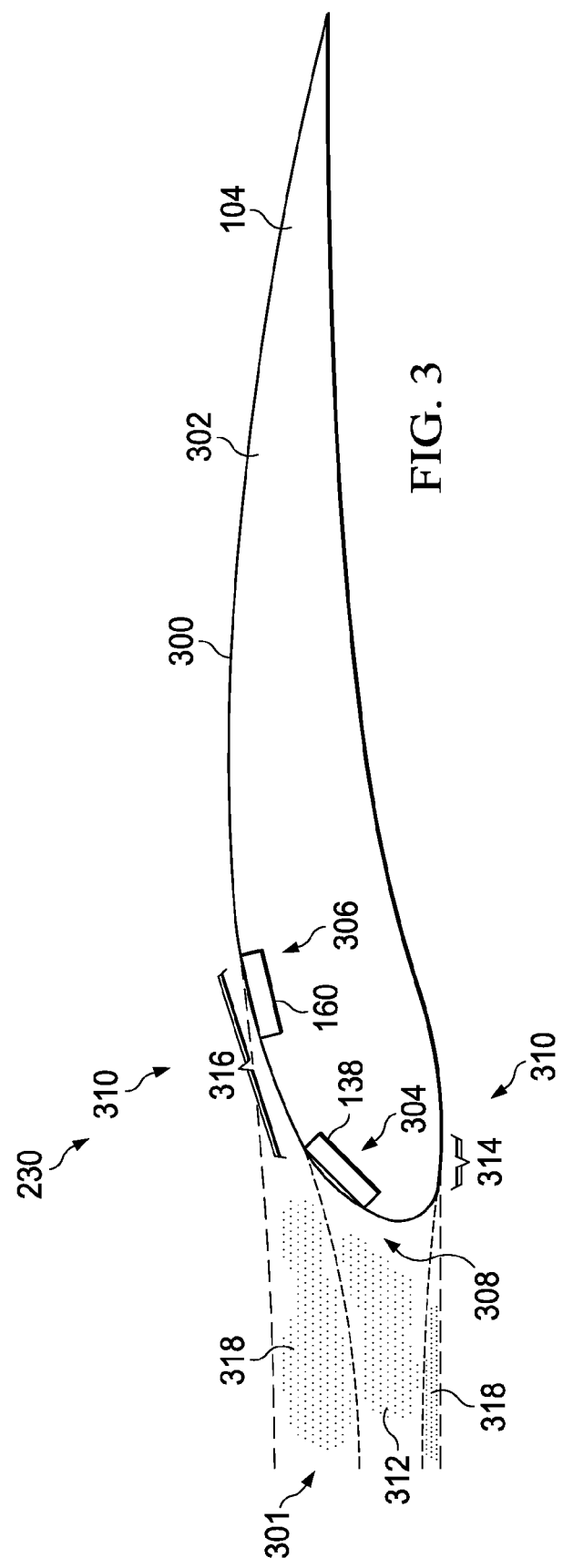
FIG. 3 is an illustration of an airfoil in accordance with an illustrative embodiment.

With reference now to FIG. 3, an illustration of an airfoil is depicted in accordance with an illustrative embodiment. In this illustrative example, airfoil 300 is wing 104 seen taken along lines 3-3 in FIG. 2. A flow of drops 301 with respect to airfoil 300 is illustrated. Locations where drops 301 collide with surface 302 are depicted in this illustrative example.

As depicted, sensor 138 and sensor 160 may be configured as ice detection assembly 230 on surface 302. In this illustrative example, sensor 138 is a first sensor located in first location 304 while sensor 160 is a second sensor located in second location 306.

In these illustrative examples, first location 304 is located in first region 308 and second location 306 is located in second region 310. As depicted, first region 308 is further forward on airfoil 300 than second region 310.

In these illustrative examples, first region 308 is comprised of a number of locations. This number of locations may be contiguous or non-contiguous with each other depending on the particular implementation. In this example, these locations are all contiguous. First region 308 is a region in which first drops 312 collide with surface 302 of airfoil 300 for aircraft 100.

Second region 310 is also a number of locations that may be contiguous or non-contiguous with each other. In this example, these locations are non-contiguous. For example, a first portion of the number of locations may be in section 314, while a second portion of the number of locations may be in section 316. Second region 310 is a region in which second drops 318 collide with surface 302 of airfoil 300 for aircraft 100. First drops 312 collide with surface 302 in first region 308 when a first type of icing condition is present. Second drops 318 collide with surface 302 in second region 310 when a second type of icing condition is present. In these illustrative examples, first region 308 is further forward on airfoil 300 as compared to second region 310.

In these illustrative examples, sensor 138 in first location 304 is configured to detect the formation of ice when a first type of icing condition is present while sensor 160 in second location 306 is configured to detect the formation of ice when a second type of icing condition is present. In some cases, both types of icing conditions may be present at the same time.

In these illustrative examples, first drops 312 and second drops 318 are supercooled drops of water. These drops of water may be rain drops. The drops may have sizes ranging from about 0.00465 millimeters to about 2.2 millimeters in average diameter.

In these illustrative examples, normal drops are drops of water typically with sizes less than 0.111 millimeters in average diameter. These drops may freeze when colliding with first region 308 of surface 302 of airfoil 300. Drops of water in freezing drizzle drops may have a diameter that is less than about 0.5 millimeters. These drops may freeze when colliding with second region 310 of surface 302 of airfoil 300. Drops of freezing rain may have a diameter that is up to about 2.2 millimeters. These drops may freeze when colliding even further aft on second region 310 of surface 302 of airfoil 300.

In these illustrative examples, freezing drizzle is drizzle that may freeze on contact with surface 302 of airfoil 300. Freezing drizzle may have a diameter that is less than about 0.5 millimeters. Freezing rain is rain that may freeze when colliding with surface 302 of airfoil 300 and may have a diameter that is up to about 2.2 millimeters.

Drops of water may be supercooled in various environments, such as in stratiform and in cumulous clouds. However, supercooled large drops typically only form in cumulous clouds.

In these illustrative examples, first drops 312 may be, for example, normal supercooled drops. Normal supercooled drops are drops of supercooled water that may have a diameter from about 0.00465 millimeters to about 0.111 millimeters. As depicted, second drops 318 may be supercooled large drops. These drops may have a diameter with a size from about 0.112 millimeters to about 2.2 millimeters.

In these illustrative examples, the different sizes between first drops 312 and second drops 318 result in first drops 312 and second drops 318 colliding with surface 302 of airfoil 300 in different locations. In these illustrative examples, the locations for the different drops are defined by first region 308 and second region 310.

As a result, placement of sensor 138 is selected such that sensor 138 will detect a first type of icing condition caused by first drops 312. Sensor 160 is in second location 306 and is configured to detect a second type of icing condition caused by second drops 318 in these illustrative examples. In other words, the placement of sensor 138 and sensor 160 on surface 302 of airfoil 300 may be selected to detect different types of icing conditions. The location selected may depend on the configuration of airfoil 300.

The illustrations of aircraft 100 with ice detection system 122 in FIGS. 1-3 are not meant to imply physical or architectural limitations to the manner in which an illustrative embodiment may be implemented. Other components in addition to and/or in place of the ones illustrated may be used. Some components may be unnecessary in some illustrative embodiments. Also, some components are shown in physical implementations while other components are shown as blocks. Blocks are presented to illustrate some functional components. One or more of the blocks illustrated may be combined, divided, or combined and divided into different blocks when implemented in an illustrative embodiment.

For example, aircraft 100 is shown in the form of an airplane. Of course, aircraft 100 may take other forms. For example, without limitation, aircraft 100 also may take the form of a helicopter. Also, although aircraft 100 is illustrated as a commercial aircraft, the different illustrative embodiments may be applied to military aircraft and other types of aircraft depending on the particular implementation. For example, aircraft 100 also may be applied to an aircraft that may fly in the air as well as enter outer space, although icing conditions do not exist at altitudes that are considered outer space.

In still another illustrative example, although sensors 124 are shown as grouped into ice detection assemblies, other illustrative embodiments may not employ ice detection assemblies. In other words, groupings of sensors into assemblies may not be used, depending on the particular implementation. In some illustrative examples, processor unit 200 may be considered part of flight management system 208 instead of a separate component in the illustrative examples.

Further, other numbers of sensors may be used other than those illustrated for aircraft 100. The number of sensors used may depend on the particular type of aircraft. For example, the number of sensors and their locations may change depending on the size and configuration of airfoils on aircraft 100. In still other illustrative examples, the sensors may all be of the same type of sensors or different types of sensors. For example, sensors 124 may be implemented using a sensor configured to detect a presence or formation of ice in these illustrative examples.

Figure 4:
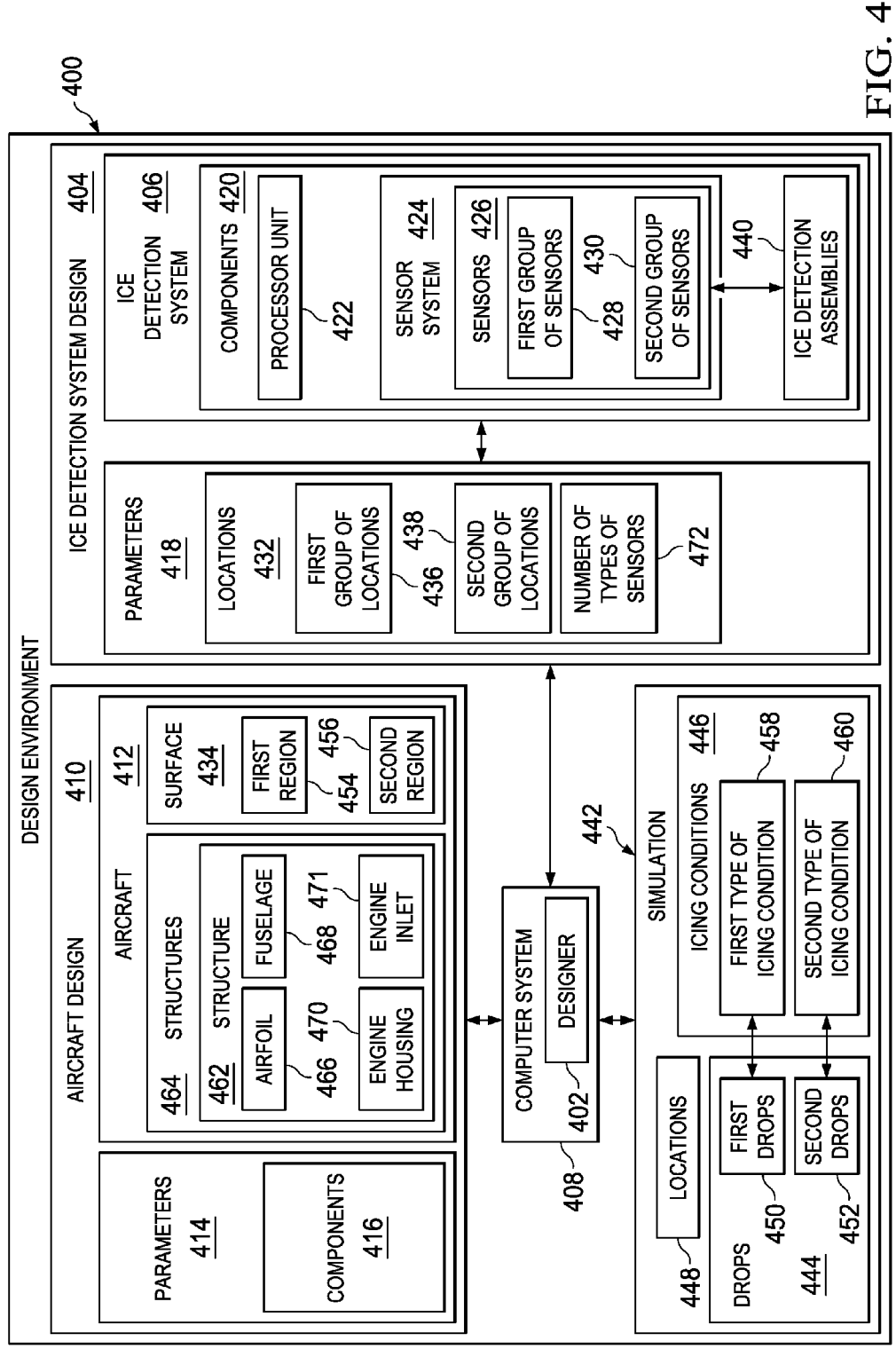
FIG. 4 is an illustration of a block diagram of a design environment in accordance with an illustrative embodiment.

Turning now to FIG. 4, an illustration of a block diagram of a design environment is depicted in accordance with an illustrative embodiment. Design environment 400 may be used to design an ice detection system for an aircraft in which the ice detection system is configured to detect a number of types of icing conditions. In this illustrative example, designer 402 may be implemented to generate ice detection system design 404 for ice detection system 406. Ice detection system 406 may be, for example, without limitation, ice detection system 122 in FIG. 1.

As illustrated, designer 402 may be implemented using software, hardware, or a combination of the two. In these illustrative examples, designer 402 may be implemented in computer system 408. Computer system 408 comprises a number of computers. When more than one computer is present in computer system 408, those computers may be in communication with each other. This communication may be facilitated using a communications medium, such as a network.

When designer 402 is implemented using software, designer 402 may take the form of program code that is configured to run on one or more computers. When hardware is employed, the hardware may include circuits that operate to perform the operations in designer 402.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being.

In this illustrative example, ice detection system design 404 may be generated using aircraft design 410 for aircraft 412. In other words, aircraft design 410 may be an input to designer 402 that is used to generate ice detection system 406. In particular, parameters 414 in aircraft design 410 for components 416 in aircraft 412 may be used to generate parameters 418 for ice detection system 406 in ice detection system design 404. Aircraft 412 may be, for example, aircraft 100 in FIG. 1.

In this illustrative example, parameters 418 in ice detection system design 404 are for components 420 in ice detection system 406. In these illustrative examples, components 420 in ice detection system 406 include processor unit 422 and sensor system 424.

Sensor system 424 comprises sensors 426. Sensors 426 include first group of sensors 428 and second group of sensors 430. In these illustrative examples, parameters 418 include locations 432 for sensors 426 in sensor system 424. In particular, locations 432 are locations on surface 434 of aircraft 412. Locations 432 may be defined using coordinates for aircraft 412.

In these illustrative examples, locations 432 include first group of locations 436 and second group of locations 438. First group of locations 436 is for first group of sensors 428. Second group of locations 438 is for second group of sensors 430. Additionally, first group of sensors 428 and second group of sensors 430 may be arranged in ice detection assemblies 440 in which a first sensor in first group of sensors 428 and a second sensor in second group of sensors 430 are in an ice detection assembly in ice detection assemblies 440.

Simulation 442 may be performed by computer system 408 to identify locations 432 for sensors 426. In these illustrative examples, simulation 442 may simulate drops 444 for icing conditions 446.

For example, simulation 442 may be performed to identify locations 448 on surface 434 of aircraft 412 where drops 444 will collide with surface 434 of aircraft 412. In these examples, drops 444 include first drops 450 and second drops 452. In this manner, simulation 442 may be used to identify first region 454 in which first drops 450 will collide with surface 434 and second region 456 in which second drops 452 will collide with surface 434 for different structures on aircraft 412. The identification of locations 448 in simulation 442 may be used to identify locations 432 for sensors 426.

In these illustrative examples, first group of locations 436 is selected such that first drops 450 in drops 444 for first type of icing condition 458 in icing conditions 446 collide with surface 434 in first group of locations 436. Second group of locations 438 is selected such that second drops 452 in drops 444 for second type of icing condition 460 in icing conditions 446 collide with surface 434 of aircraft 412 in second group of locations 438. In these illustrative examples, first drops 450 for first type of icing condition 458 may be normal supercooled drops. Second drops 452 for second type of icing condition 460 may be supercooled large drops in these illustrative examples.

In the depicted examples, first group of locations 436 may be within first region 454 on surface 434 of structure 462 in structures 464 in aircraft 412. Second group of locations 438 may be located in second region 456 on surface 434 of structure 462. In these illustrative examples, structure 462 in aircraft 412 may take the form of airfoil 466, fuselage 468, engine housing 470, engine inlet 471, and other suitable types of structures on aircraft 412.

Further, simulation 442 also may be used to select the number of sensors within sensors 426 in addition to locations 432 for sensors 426. Also, simulation 442 may be used to determine number of types of sensors 472 that may be used to implement sensors 426 in sensor system 424.

The illustration of design environment 400 in FIG. 4 is not meant to imply physical or architectural limitations the manner in which an illustrative embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, ice detection system design 404 may be used to identify additional locations in locations 432 for sensors 426 to detect one or more additional types of icing conditions in addition to first type of icing condition 458 and second type of icing condition 460.

In still other illustrative examples, designer 402 may be used to modify ice detection system design 404 instead of creating ice detection system design 404. For example, ice detection system design 404 may already include first group of sensors 428 in first group of locations 436. Ice detection system design 404 may be modified to identify second group of locations 438 for second group of sensors 430. In this manner, designer 402 may be used to identify modifications to existing ice detection systems in these illustrative examples. In still other illustrative examples, ice detection system design 404 may be part of aircraft design 410 instead of a separate design.

The different components illustrated in FIGS. 1-3 may be combined with components shown in FIG. 4, used with components in FIG. 4, or a combination of the two. Additionally, some of the components illustrated in FIGS. 1-3 may be examples of how components shown in block form in FIG. 4 may be implemented as physical structures.

Figure 5:
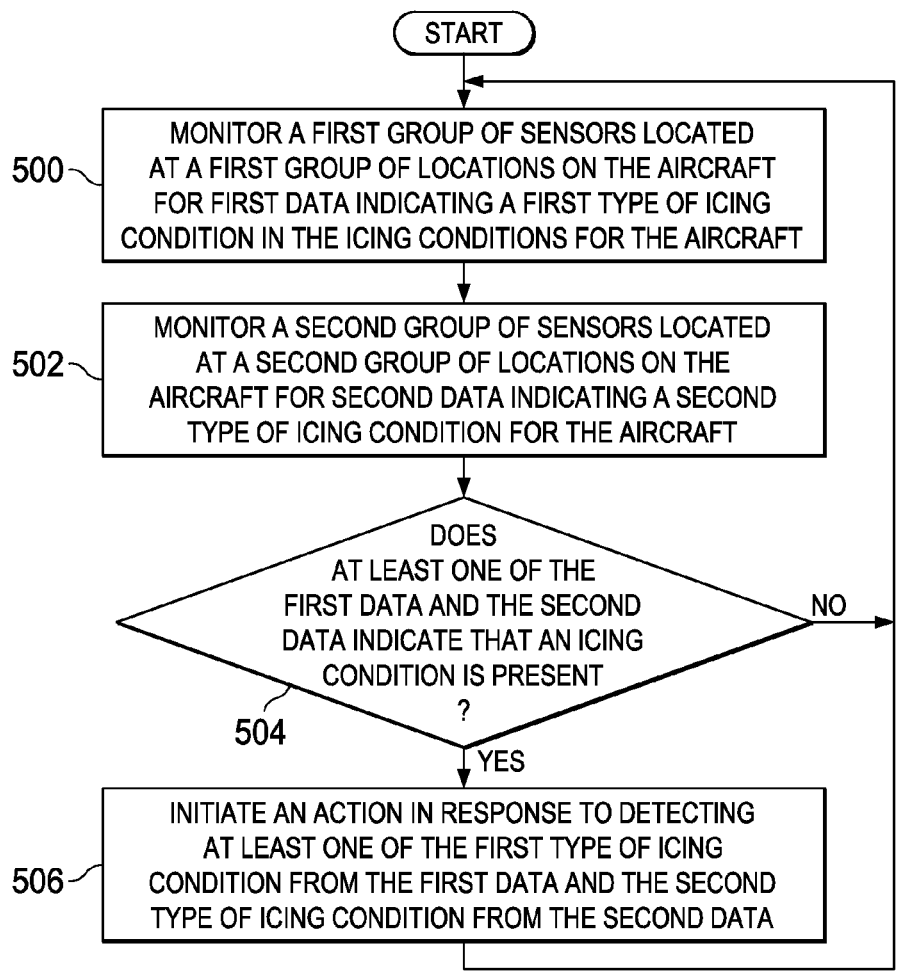
FIG. 5 is an illustration of a flowchart of a process for detecting icing conditions for an aircraft in accordance with an illustrative embodiment.

With reference now to FIG. 5, an illustration of a flowchart of a process for detecting icing conditions for an aircraft is depicted in accordance with an illustrative embodiment. The process illustrated in FIG. 5 may be implemented in an ice detection system such as ice detection system 406 as specified by ice detection system design 404 in FIG. 4. Further, the process may be implemented in ice detection system 122 for aircraft 100 in FIG. 1. In particular, one or more operations performed in this flowchart may be implemented using processor unit 200 in FIG. 2.

The process begins by monitoring a first group of sensors located at a first group of locations on the aircraft for first data indicating a first type of icing condition in the icing conditions for the aircraft (operation 500). The first group of sensors in operation 500 may be first group of sensors 148 in ice detection system 122 in FIG. 1. The process then monitors a second group of sensors located at a second group of locations on the aircraft for second data indicating a second type of icing condition for the aircraft (operation 502). The second group of sensors in operation 502 may be second group of sensors 170 in ice detection system 122 in FIG. 1.

A determination is made as to whether at least one of the first data and the second data indicates that an icing condition is present (operation 504). If an icing condition is not present, the process returns to operation 500 as described above. Otherwise, the process initiates an action in response to detecting at least one of the first type of icing condition from the first data and the second type of icing condition from the second data (operation 506), with the process then returning to operation 500 as described above.

Figure 6:
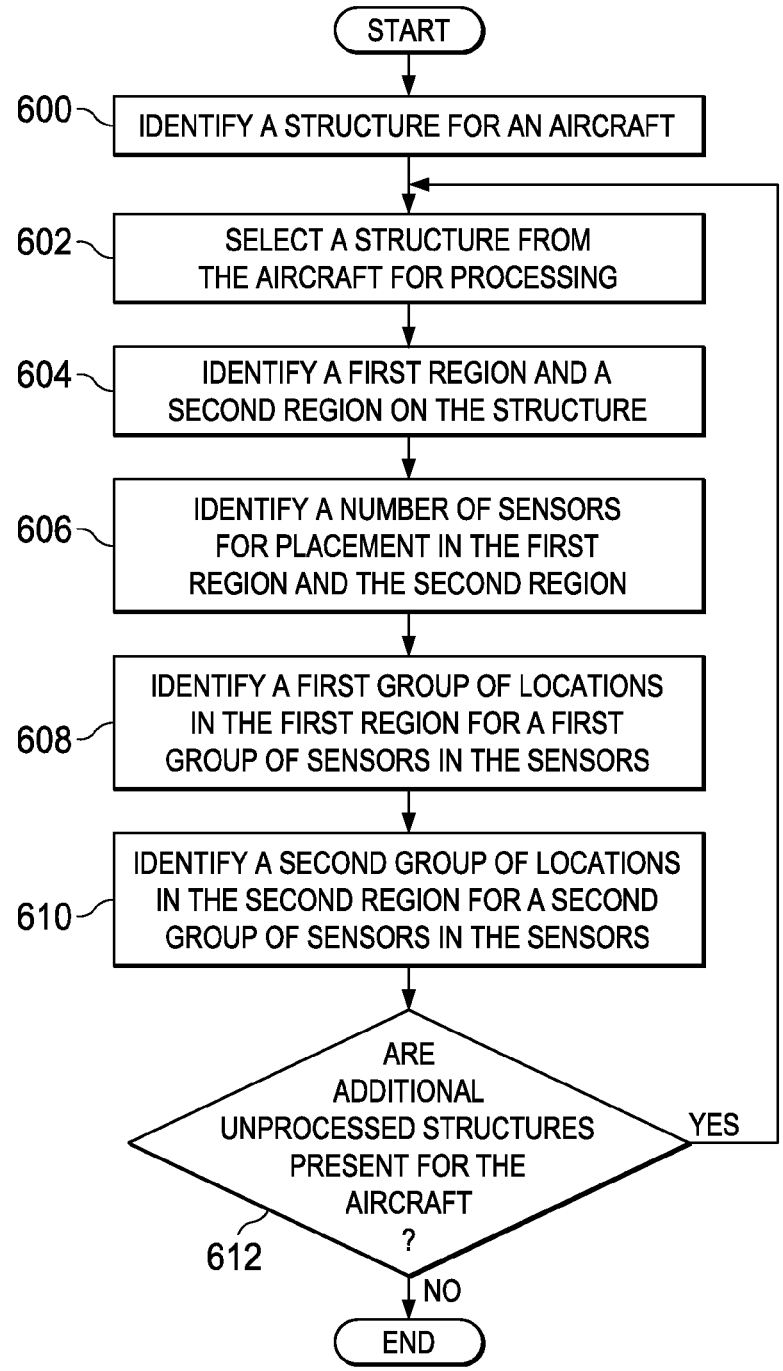
FIG. 6 is an illustration of a flowchart of a process for designing an ice detection system in accordance with an illustrative embodiment.

With reference now to FIG. 6, an illustration of a flowchart of a process for designing an ice detection system is depicted in accordance with an illustrative embodiment. The process illustrated in FIG. 6 may be implemented in design environment 400 in FIG. 4. In particular, the process may be implemented using designer 402 in FIG. 4.

The process begins by identifying a structure for an aircraft (operation 600). These structures may be any structure on which ice may form when one or more types of icing conditions are present. The process then selects a structure from the aircraft for processing (operation 602).

The process then identifies a first region and a second region on the structure (operation 604). The first region is a region in which first drops for a first type of icing condition collide with the surface of the aircraft. The second region is a region in which second drops for a second type of icing condition collide with the surface of the aircraft. The process then identifies a number of sensors for placement in the first region and the second region (operation 606). In some cases, sensors may be absent from one region on the structure depending on the implementation.

The process then identifies a first group of locations in the first region for a first group of sensors in the sensors (operation 608). The process then identifies a second group of locations in the second region for a second group of sensors in the sensors (operation 610). A determination is made as to whether additional unprocessed structures are present for the aircraft (operation 612). If additional unprocessed structures are present, the process returns to operation 602 as described above. Otherwise, the process terminates. When the process is completed, the design for the ice detection system may be finished and ready for implementation.

The flowcharts and block diagrams in the different depicted embodiments illustrate the architecture, functionality, and operation of some possible implementations of apparatuses, methods, and computer program products. In this regard, each block in the flowcharts or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Figure 7:
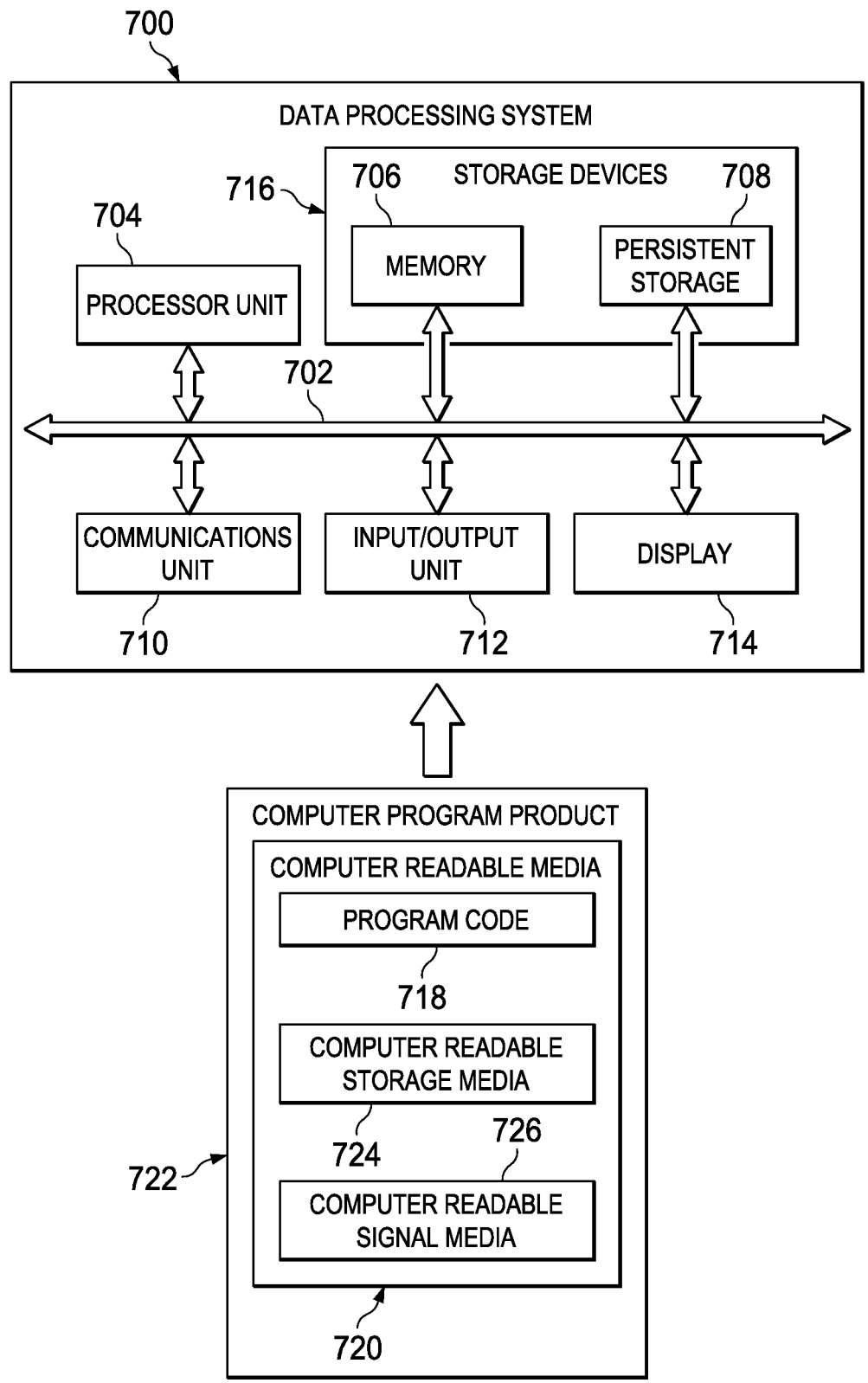
FIG. 7 is an illustration of a data processing system in accordance with an illustrative embodiment.

Turning now to FIG. 7, an illustration of a data processing system is depicted in accordance with an illustrative embodiment. Data processing system 700 may be used to implement flight management system 208 in FIG. 2, computer system 408 in FIG. 4, and other computers that may be used in different illustrative embodiments. In this illustrative example, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In these illustrative examples, processor unit 704 is an example of a processor unit that may be used to implement processor unit 200 in FIG. 2.

Memory 706 and persistent storage 708 are examples of storage devices 716. A storage device is any piece of hardware that is capable of storing information such as, for example, without limitation, data, program code in functional form, and other suitable information either on a temporary basis or a permanent basis. Storage devices 716 also may be referred to as computer readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718. Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 700 are not meant to provide physical or architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

Figure 8:
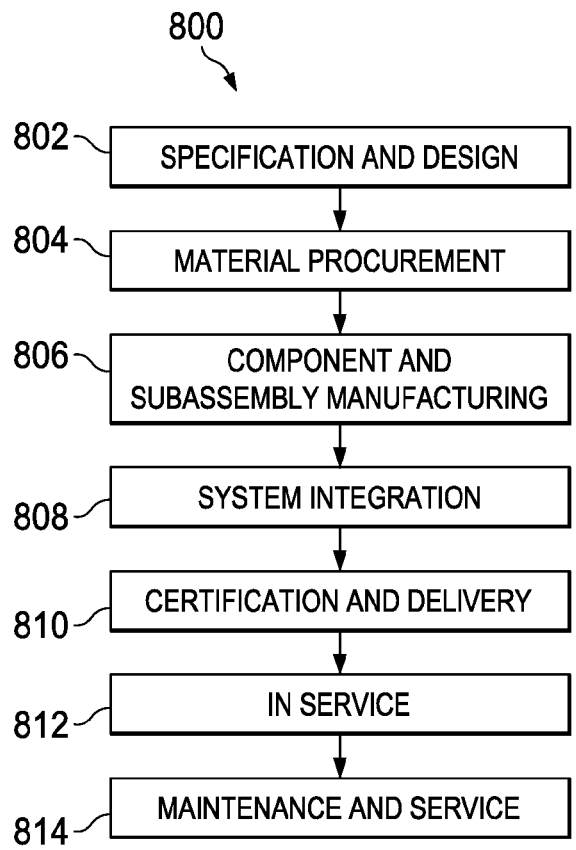
FIG. 8 is an illustration of an aircraft manufacturing and service method in accordance with an illustrative embodiment.
Figure 9:
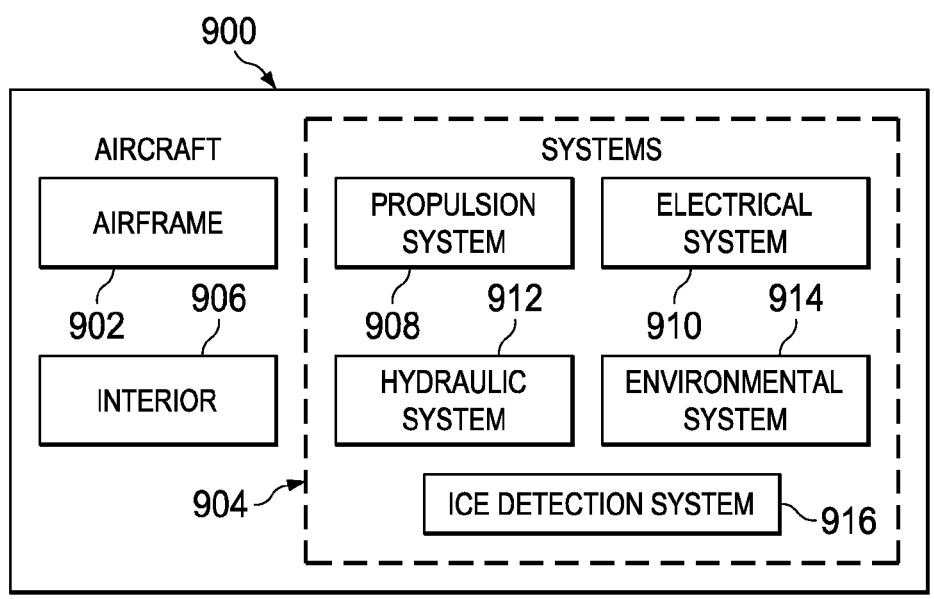
FIG. 9 is an illustration of an aircraft in which an illustrative embodiment may be implemented.

Illustrative embodiments of the disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 in FIG. 9 takes place. Thereafter, aircraft 900 in FIG. 9 may go through certification and delivery 810 in order to be placed in service 812. While in service 812 by a customer, aircraft 900 in FIG. 9 is scheduled for routine maintenance and service 814, which may include modification, reconfiguration, refurbishment, and other maintenance or service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of an aircraft is depicted in which an illustrative embodiment may be implemented. In this example, aircraft 900 is produced by aircraft manufacturing and service method 800 in FIG. 8 and may include airframe 902 with plurality of systems 904 and interior 906. Examples of systems 904 include one or more of propulsion system 908, electrical system 910, hydraulic system 912, environmental system 914, and ice detection system 916. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800 in FIG. 8. In one illustrative example, components or subassemblies produced in component and subassembly manufacturing 806 in FIG. 8 may be fabricated or manufactured in a manner similar to components or subassemblies produced while aircraft 900 is in service 812 in FIG. 8.

As yet another example, one or more apparatus embodiments, method embodiments, or a combination thereof may be utilized during different stages of aircraft manufacturing and service method 800. For example, ice detection system 916 may be designed during specification and design 802. Components for ice detection system 916 may be manufactured during component and subassembly manufacturing 806. Ice detection system 916 may be installed in aircraft 900 during system integration 808. Ice detection system 916 may be used while aircraft 900 is in service 812.

In another illustrative example, ice detection system 916 may be an existing ice detection system in aircraft 900. Upgrades, modifications, and other operations may be performed to modify ice detection system 916 on aircraft 900 to include features in accordance with an illustrative embodiment.

Thus, one or more illustrative embodiments provide a method and apparatus for identifying different types of icing conditions. In particular, an illustrative embodiment provides an ability to identify a first type of icing condition and a second type of icing condition. The first type of icing condition may be one typically encountered while the second type of icing condition may be a supercooled large drop icing condition. In these illustrative examples, the ability to identify more than one type of icing condition may allow an aircraft to be certified for flight in different types of icing conditions under various regulations that may be present from government or other regulatory entities, such as the Federal Aviation Administration.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An ice detection system for detecting a plurality of in-flight icing conditions comprising:

a first group of sensors located in a first group of locations on an aircraft, wherein the first group of sensors in the first group of locations is configured to detect a first type of icing condition for the aircraft, wherein the first group of locations is selected to be on first areas of the aircraft where collision with water drops of a first size range is expected to occur more frequently during flight of the aircraft than collision with water drops of a second size range, and wherein the first type of icing condition is associated with water drops of the first size range; and a second group of sensors located in a second group of locations on the aircraft, wherein the second group of sensors in the second group of locations is configured to detect a second type of icing condition for the aircraft, wherein the second group of locations is selected to be on second areas of the aircraft where collision with water drops of the second size range is expected to occur more frequently during flight of the aircraft than collision with water drops of the first size range, wherein the second type of icing condition is associated with water drops of the second size range, and wherein the first size range is less than the second size range; and a processor unit configured to monitor in-flight data from the first group of sensors and responsive to the first group of sensors detecting the first type of icing condition for the aircraft, perform a first action in response to the data indicating a presence of at least one of the first type of icing condition, wherein the first action comprises generating, during flight, a first alert on a flight deck interface for the aircraft, wherein the processor unit is further to monitor in-flight data from the second group of sensors and responsive to the second group of sensors detecting the second type of icing condition for the aircraft, perform a second action in response to the data indicating a presence of at least one of the first type of icing condition, wherein the second action comprises generating, during flight, a second alert on the flight deck interface for the aircraft.

2. The ice detection system of claim 1, wherein the first group of locations is a first number of locations in which first drops for the first type of icing condition collide with a surface of the aircraft and the second group of locations is a second number of locations in which second drops for the second type of icing condition collide with the surface of the aircraft.

3. The ice detection system of claim 2, wherein the surface is a surface of an airfoil for the aircraft and wherein the first drops collide with the surface in a first region on the surface of the airfoil, the second drops collide with the surface in a second region on the surface of the airfoil, and the first region is further forward on the airfoil than the second region.

4. The ice detection system of claim 1, wherein the second type of icing condition is a supercooled large drop icing condition.

5. The ice detection system of claim 1, wherein the action is selected from at least one of generating an alert, generating a log entry, activating an anti-icing system, and sending a report.

6. The ice detection system of claim 1, wherein the first group of locations and the second group of locations are on a structure for the aircraft and the structure is selected from one of an airfoil, a wing, a horizontal stabilizer, a vertical stabilizer, a fuselage, an engine inlet, and a nose portion of the fuselage.

7. The ice detection system of claim 1, wherein a first sensor in the first group of sensors and a second sensor in the second group of sensors form a sensor pair, wherein the first sensor is a forward sensor and the second sensor is an aft sensor that is located in a location that is aft of the forward sensor.

8. The ice detection system of claim 1, wherein sensors in the first group of sensors and the second group of sensors are configured to detect a presence of ice.

9. The ice detection system of claim 1, wherein the aircraft is selected from one of a commercial aircraft, a military aircraft, an airplane, and a helicopter.

10. An ice detection system for detecting a plurality of in-flight icing conditions comprising:
    a group of sensors located in a group of locations on a surface of an aircraft, wherein the group of sensors in the group of locations is configured to detect a supercooled large drop icing condition on the surface of the aircraft, wherein the group of locations is selected to be on first areas of the aircraft where collision with supercooled large water drops is expected to occur more frequently during flight of the aircraft than collision with smaller water drop sizes; and
    a processor unit configured to monitor in-flight data from the group of sensors and perform an action in response to the data indicating a presence of the supercooled large drop icing condition on the surface of the aircraft wherein the action comprises generating, during flight, a first alert on a flight deck interface for the aircraft.

11. The ice detection system of claim 10, wherein the group of sensors is a second group of sensors and further comprising:
    a first group of sensors configured to detect another type of icing condition on the surface of the aircraft.

12. The ice detection system of claim 10, wherein the surface is a surface of an airfoil for the aircraft and wherein the drops collide with the surface in a region on the surface of the airfoil that is further aft as compared to drops from another type of icing condition on the surface of the airfoil.

13. The ice detection system of claim 10, wherein the drops have a diameter from about 0.112 millimeters to about 2.2 millimeters.

14. The ice detection system of claim 10, wherein the action is selected from at least one of generating an alert, generating a log entry, activating an anti-icing system, and sending a report.

15. A method for detecting a plurality of in-flight icing conditions for an aircraft, the method comprising:
    monitoring, during flight of the aircraft, a first group of sensors located in a first group of locations on the aircraft for first data indicating a first type of icing condition in the icing conditions for the aircraft, wherein the first group of locations is selected to be on first areas of the aircraft where collision with water drops of a first size range is expected to occur more frequently than collision with water drops of a second size range, and wherein the first type of icing condition is associated with water drops of the first size range;
    monitoring, during flight of the aircraft, a second group of sensors located in a second group of locations on the aircraft for second data indicating a second type of icing condition in the icing conditions for the aircraft, wherein the second group of locations is selected to be on second areas of the aircraft where collision with water drops of the second size range is expected to occur more frequently than collision with water drops of the first size range, wherein the second type of icing condition is associated with water drops of the second size range, and wherein the first size range is less than the second size range; and
    initiating a first action in response to detecting the first type of icing condition from the first data, wherein the first action comprises generating, during flight, a first alert on a flight deck interface for the aircraft, and initiating a second action in response to detecting the second type of icing condition from the second data, wherein the second action comprises generating, during flight, a second alert on the flight deck interface for the aircraft.

16. The method of claim 15 further comprising:
    responsive to detecting an icing condition from at least one of the first data and the second data, identifying a location on the aircraft in which the icing condition is detected.

17. The method of claim 15, wherein initiating the action in response to detecting the at least one of the first type of icing condition from the first data and the second type of icing condition from the second data comprises:
    initiating the action in response to detecting the at least one of the first type of icing condition from the first data and the second type of icing condition from the second data, wherein the action is selected from at least one of generating an alert, generating a log entry, activating an anti-icing system, and sending a report.

* * * * *